US010160624B2

(12) United States Patent
Murakami et al.

(10) Patent No.: US 10,160,624 B2
(45) Date of Patent: Dec. 25, 2018

(54) TRAVEL FACILITY

(71) Applicant: Daifuku Co., Ltd., Osaka-shi (JP)

(72) Inventors: Ryuya Murakami, Shiga (JP); Yoshinari Wada, Shiga (JP)

(73) Assignee: Daifuku Co., Ltd., Osaka-shi (JP)

(*) Notice: Subject to any disclaimer, the term of this patent is extended or adjusted under 35 U.S.C. 154(b) by 0 days.

(21) Appl. No.: 14/955,310

(22) Filed: Dec. 1, 2015

(65) Prior Publication Data

US 2016/0152450 A1    Jun. 2, 2016

(30) Foreign Application Priority Data

Dec. 2, 2014 (JP) .................. 2014-243976

(51) Int. Cl.
| | |
|---|---|
| *B66C 7/12* | (2006.01) |
| *B66C 7/02* | (2006.01) |
| *B66C 9/02* | (2006.01) |
| *B66C 9/04* | (2006.01) |
| *B66C 9/14* | (2006.01) |

(52) U.S. Cl.
CPC .................. *B66C 7/12* (2013.01); *B66C 7/02* (2013.01); *B66C 9/02* (2013.01); *B66C 9/04* (2013.01); *B66C 9/14* (2013.01)

(58) Field of Classification Search
None
See application file for complete search history.

(56) References Cited

U.S. PATENT DOCUMENTS

| | | | | |
|---|---|---|---|---|
| 2008/0055103 | A1* | 3/2008 | Koide ................. | B65G 1/0421 340/686.6 |
| 2010/0242784 | A1* | 9/2010 | Oguro ............... | H01L 21/67715 104/130.01 |
| 2014/0090954 | A1* | 4/2014 | Murayama ........ | H01L 21/67715 198/348 |
| 2014/0277862 | A1* | 9/2014 | Pritchard ............... | B61C 17/12 701/19 |

FOREIGN PATENT DOCUMENTS

| | | |
|---|---|---|
| JP | 6227394 A | 8/1994 |
| JP | 115520 A | 1/1999 |
| JP | 2000188319 A | 7/2000 |

* cited by examiner

*Primary Examiner* — Lail A Kleinman

(74) *Attorney, Agent, or Firm* — The Webb Law Firm

(57) ABSTRACT

Object is to provide a travel facility in which a travel member, that became incapable of traveling due to a cause other than a power supply failure, can be moved to another location on a travel path. A second travel member, provided separately from the first travel member, includes an external signal generating portion for generating an external travel control signal to be sent to a first travel actuator and a connecting portion which can transmit the external travel control signal. The first travel member includes a first connecting portion which can receive the external travel control signal and can transmit the external control signal to the first travel actuator. A connecting member for receiving and transmitting the external travel control signal is removably connected to, and between, the first connecting portion and the second connecting portion.

17 Claims, 6 Drawing Sheets

TRAVEL FACILITY

CROSS-REFERENCE TO RELATED APPLICATION

This application claims priority to Japanese Patent Application No. 2014-243976 filed Dec. 2, 2014, the disclosure of which is hereby incorporated in its entirety by reference.

FIELD OF THE INVENTION

The present invention relates to a travel facility in which a travel member configured to travel along a travel path includes a first travel actuator for actuating the travel member to cause the travel member to travel, and a controller that controls actuating operation of the travel actuator.

BACKGROUND

In JP Publication of Application No. H06-227394 (Patent Document 1) for example, a travel facility is described in which a travel path is defined in an area inaccessible to workers (e.g., inside a pressurized chamber of a nuclear reactor, etc.) and in which a travel member (which is a vehicle) carrying a measuring instrument travels along the travel path.

The travel member of Patent Document 1 includes an electric-powered travel actuator and is moved by the driving or actuating force from the travel actuator. However, when the electric power to the travel actuator in the travel path is interrupted due, for example, to a power supply circuit malfunction, it becomes impossible for the travel member to continue traveling, resulting in the travel member being stranded within the pressurized chamber. To this end, in the travel facility of Patent Document 1, an relief travel member is provided as an additional travel member which can travel along the travel path. The relief travel member supplies electric power for activating the travel actuator to the travel member that has malfunctioned (referred to as the malfunctioned travel member).

Incidentally, in such a travel facility, a travel actuator for actuating the travel member to cause it to travel, and a controller for controlling the operation of the travel actuator are mounted on the travel member in some cases. As described above, if the cause that made it impossible for the malfunctioned travel member to travel is an interruption of the electric power supply to the malfunctioned travel member, the malfunctioned travel member can be made to travel again by supplying electric power to the malfunctioned travel member from the relief travel member. However, if a controller malfunction is the cause that made it impossible for the malfunctioned travel member to travel, then the malfunctioned travel member cannot be made to travel only by supplying electric power to the malfunctioned travel member.

SUMMARY OF THE INVENTION

In light of the above, a travel facility is desired in which a travel member can be moved to another location on a travel path even when the controller of the travel member malfunctions.

In light of the above, a travel facility, including travel members configured to travel along a travel path, comprises: a first travel member provided as one of the travel members; a first travel actuator provided to the first travel member for actuating the first travel member to cause the first travel member to travel; a first controller provided to the first travel member for generating a travel control signal to be sent to the first travel actuator to control actuating operation of the first travel actuator; a second travel member provided as another one of the travel members, separately from the first travel member; a second travel actuator provided to the second travel member for actuating the second travel member to cause the second travel member to travel; a second controller provided to the second travel member for generating a travel control signal to be sent to the second travel actuator to control actuating operation of the second travel actuator; an external signal generating portion provided to the second travel member for generating an external travel control signal to be sent to the first travel actuator; a first connecting portion provided to the first travel member for receiving the external travel control signal and transmitting the external travel control signal to the first travel actuator; a second connecting portion provided to the second travel member and capable of transmitting the external travel control signal generated by the external signal generating portion; and a connecting member removably connected to, and between, the first connecting portion and the second connecting portion, for receiving and transmitting the external travel control signal.

With the arrangement described above, when the first travel member becomes incapable of traveling along the travel path due to a malfunction of the first controller, the actuation or movement of the first travel member can be controlled by the second travel member. More specifically, the actuating operation of the first travel actuator can be controlled by the second travel member by transmitting the external travel control signal generated by the external signal generating portion of the second travel member to the first travel member through the connecting member. Therefore, even when the controller of a travel member malfunctions, the travel member can be moved to another location on the travel path.

Additional features and advantages of the transport facility will become clear from the following descriptions of the embodiments described with reference to the attached drawings.

DETAILED DESCRIPTION

Figure 1:
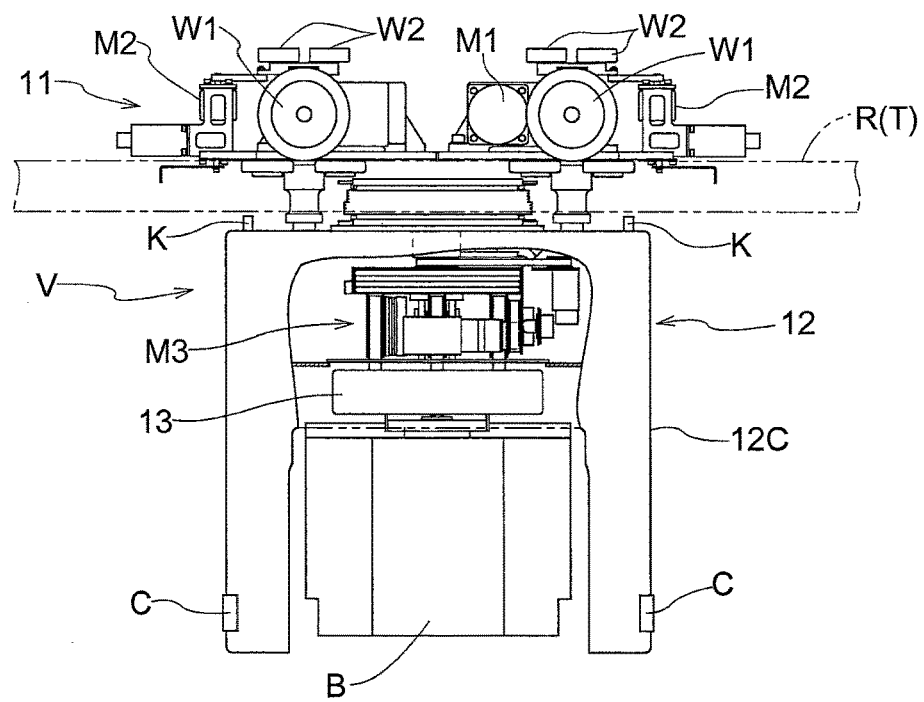
FIG. 1 is a partially cut-out side view of a ceiling transport vehicle.
Figure 2:
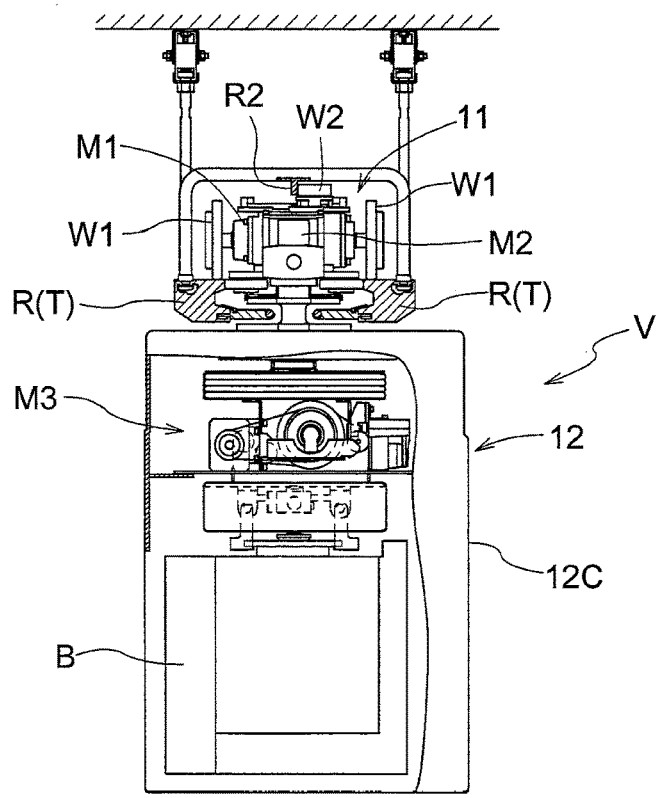
FIG. 2 is a partially cut-out front view of the ceiling transport vehicle.

Embodiments, in which a travel facility including a first travel member and a second travel member is incorporated into a ceiling or overhead transport facility, are described next with reference to the drawings. As shown in FIGS. 1 and 2, the ceiling or overhead transport facility includes ceiling, or overhead, transport vehicles V each of which includes a travel portion 11 having travel wheels W1 adapted to travel or roll on travel rails R that are suspended from the ceiling, and a main body portion 12 which is suspended from and thus supported by the travel portion 11. The travel portion 11 includes the travel wheels W1 configured to roll on the travel rails R and a travel motor M1 of an electric-power driven type for drivingly rotating the travel wheels W1. In addition, a negative brake mechanism N (see FIGS. 5 and 8) is provided to a transmitting mechanism having a transmitting shaft for transmitting the rotational output of the travel motor M1 to the travel wheels W1. The negative brake mechanism N is configured such that urging force of an urging member within the negative brake mechanism N applies braking force against rotation of the transmitting shaft when there is no electric power supplied to the negative brake mechanism N and such that the braking state or the braking action is suspended, or stopped, by supplying electric power.

Figure 3:
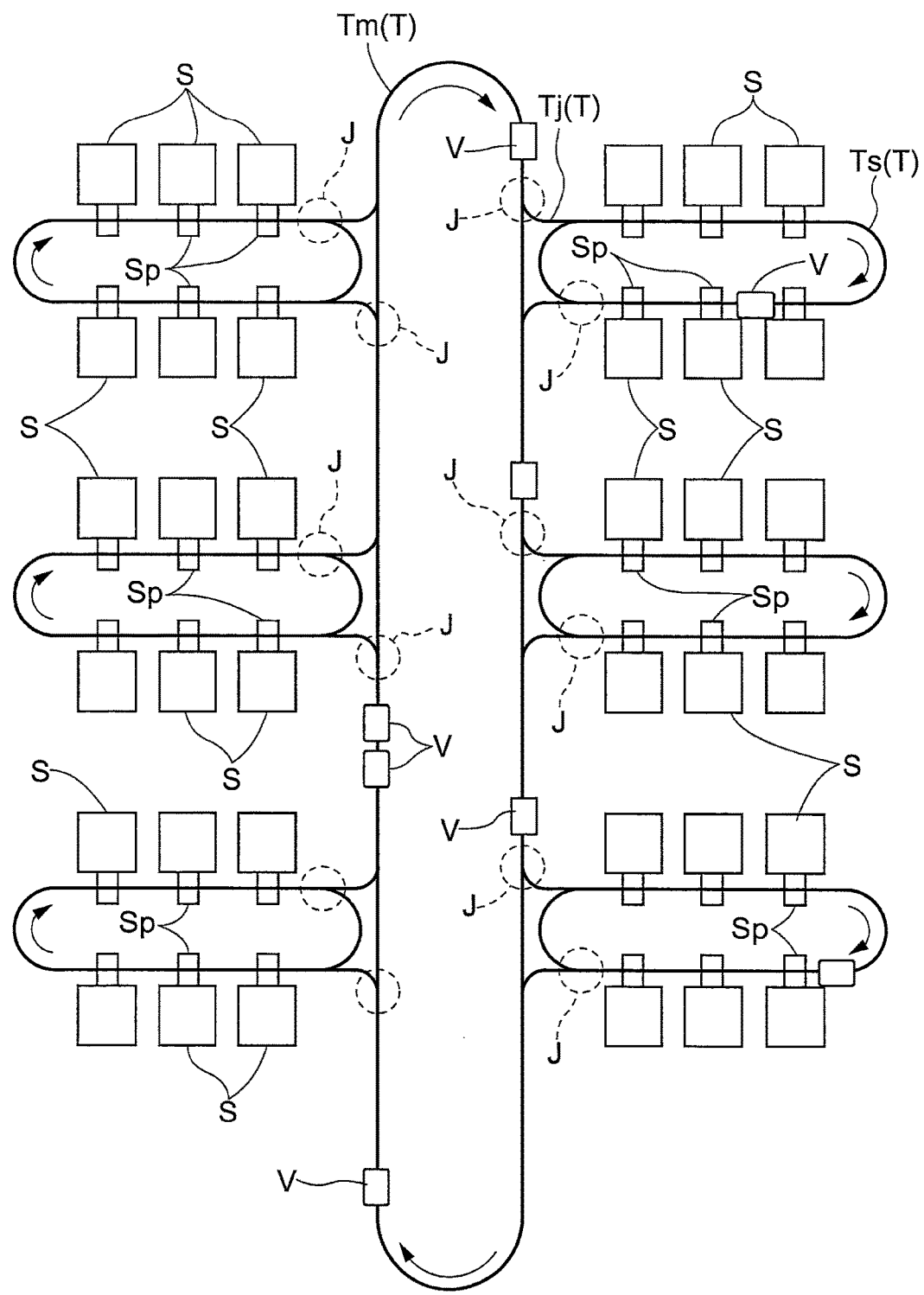
FIG. 3 is a diagrammatic plan view of a ceiling transport facility.

Provided in the travel portion 11 are guide rollers W2 which are guided by a guide rail R2 (see FIGS. 2 and 4) provided in each branching portion (see branching portions J, locations enclosed by dotted circles in FIG. 3) of the travel paths T along the travel rails R. The guide rollers W2 are configured to be moved laterally, or along the right and left direction, as seen along the travel direction of the travel portion 11 (see FIG. 2). In addition, the guide rollers W2 are provided with guide roller solenoids M2 of an electric-power driven type for changing the lateral position of the guide rollers W2 between a left-hand side position and a right-hand side position along the lateral direction and for holding the guide rollers W2 at the selected position. The guide rollers W2 are configured such that, when they are in the left-hand side position, they are in contact with the left-hand side surface of the guide rail R2 as seen forward in the travel direction of the travel portion 11 whereas, when they are in the right-hand side position, they are in contact with the right-hand side surface of the guide rail R2 as seen forward in the travel direction of the travel portion 11.

The main body portion 12 has a cover portion 12C which extends from the forward portion of the main body portion 12 to its back portion, with respect to the travel direction of the travel portion 11. As shown in FIG. 1, the cover portion 12C is formed to have an inverted U-shape that opens downward in a side view (i.e., as seen along a horizontal direction that is perpendicular to the travel direction of the travel portion 11). In addition, as shown in FIGS. 1 and 2, the main body portion 12 includes a vertically movable member 13 which is vertically movable and is configured to hold an article B (which, in the present embodiment, is a container called a FOUP adapted to hold semiconductor substrates in vertically spaced apart arrangement), and an electric-powered vertical movement actuator M3 for drivingly and vertically moving the vertically movable member 13. And the main body portion 12 or the vehicle V is configured to travel while holding an article B to be transported with the vertically movable member 13. In addition, the vertically movable member 13 is provided with a grip portion for gripping or holding a flange provided in an upper end of the FOUP which is the article B. However, description for the grip portion is omitted in the present embodiment since a well-known arrangement is adopted for this grip portion.

In addition, an engaging projecting portion K which projects upwardly is provided on the upper end portion of the cover portion 12C and in each of the forward end portion and back end portion in the cover portion 12C in the travel direction of the travel portion 11. The engaging projecting portion K is configured to engage a looped portion Fr of a linking member F, as will be described below in detail with reference to FIGS. 6 and 8 etc. Further, a connector portion C to which a connecting plug Dp of a connecting member D is connected is provided on each of the front side face and the back side face of the cover portion 12C with respect to the travel direction of the travel portion 11. The connector portion C, etc. will be described below with reference to FIGS. 7 and 8.

As shown in FIG. 3, the travel paths T, along which the ceiling transport vehicles V described above are configured to travel, include a loop-shaped main travel path Tm, and loop-shaped secondary travel paths Ts provided on both sides of the main travel path Tm. The main travel path Tm and each secondary travel path Ts are connected to each other by connecting paths Tj. The travel direction of each ceiling transport vehicle V along the main travel path Tm and along each secondary travel path Ts is set to be one direction. The portions enclosed by dotted lines in FIG. 3 are either a branching portion J for traveling from the main travel path Tm to a secondary travel path Ts, or a branching portion J for traveling from a secondary travel path Ts to the main travel path Tm.

Each ceiling transport vehicle V is configured to transport articles, one at a time, B among transfer locations (referred to, hereinafter, as stations Sp) for a plurality of processing devices S installed along the travel paths T, with the transported article being an article B holding semiconductor substrates. Each processing device S is configured to perform a predetermined operation on work-in-process parts in the manufacturing of semiconductor substrates, etc.

Figure 4:
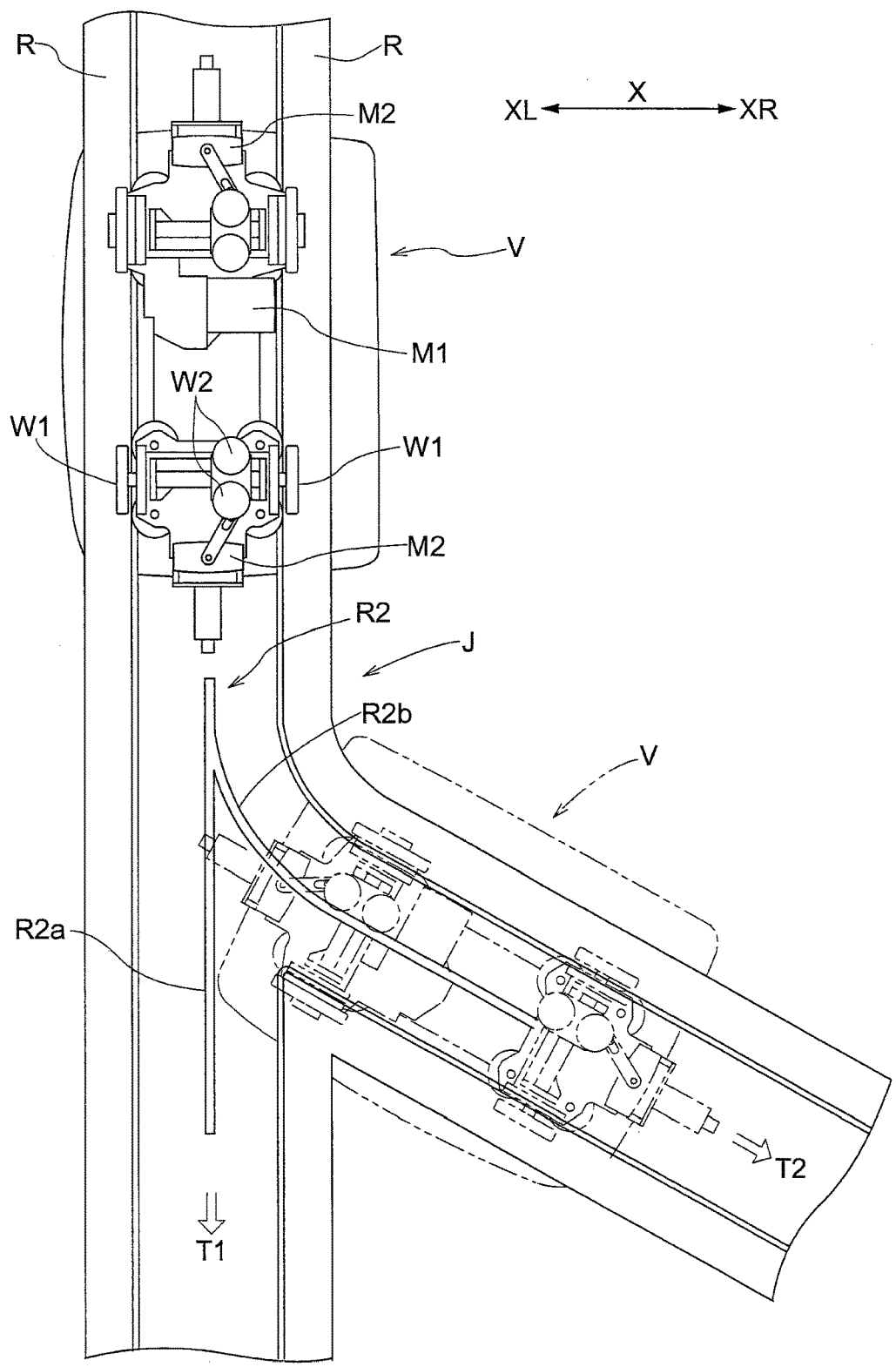
FIG. 4 is a plan view showing a branching portion of travel rails.

As shown in FIG. 4, a guide rail R2 is provided between a pair travel rails R in each branching portion J. The guide rail R2 branches, or splits, into a first branching guide rail R2a and a second branching guide rail R2b so as to correspond to the branching arrangement of the travel path T (i.e., with the first branching guide rail R2a being provided for one path which the travel path T branches into and the second branching guide rail R2b being provided for the other path which the travel path T branches into.) In FIG. 4, the ceiling transport vehicle V before the branching is indicated with solid lines whereas the ceiling transport vehicle V after the branching is indicated with dashed lines. In the description below, the travel direction into one of the travel paths T that the travel path T branches, or splits, into in the branching portion J will be referred to as a first travel direction T1 whereas the travel direction into the other of the travel paths T will be referred to as a second travel direction T2.

When directing the ceiling transport vehicle V to cause it to travel in the first travel direction T1, the guide rollers W2 are moved in the XL direction by the guide roller solenoids M2. This will cause the guide rollers W2 to come into contact with and to be thus guided by the surface, on the XL side, of the first branching guide rail R2a so that the ceiling transport vehicle V travels along the travel path T extending in the first travel direction T1. Similarly, as shown in FIG. 4, when directing the ceiling transport vehicle V to cause it to travel in the second travel direction T2, the guide rollers W2 are moved in the XR direction by the guide roller solenoids M2. This will cause the guide rollers W2 to come into contact with and to be thus guided by the surface, on the XR side, of the second branching guide rail R2b so that the ceiling transport vehicle V travels along the travel path T extending in the second travel direction T2.

In other words, the travel rails R and guide rails R2 for guiding travel of the ceiling transport vehicle V are provided to extend along the travel paths T. In addition, the travel paths T includes branching portions J each of which branches, or splits, into a plurality of travel paths T (the path extending in the first travel direction T1 and the path extending in the second travel direction T2) to which the ceiling transport vehicle V travels. And the guide rail R2 is configured such that it branches or splits in the branching portion J into the first branching guide rail R2a and the second branching guide rail R2b that correspond to respective ones of the travel paths T. Each ceiling transport vehicle V includes the guide rollers W2 which function as guide members that are guided by the guide rail R2. And each guide roller solenoid M2 changes the position of the guide rollers W2 to a position that corresponds to either of the branching guide rails (R2a, R2b) to which the ceiling transport vehicle V is to be guided, among the plurality of branching guide rails (R2a, R2b). That is, the guide roller solenoid M2 is configured to function as a steering operation portion for changing the travel direction of the ceiling transport vehicle V.

Figure 5:
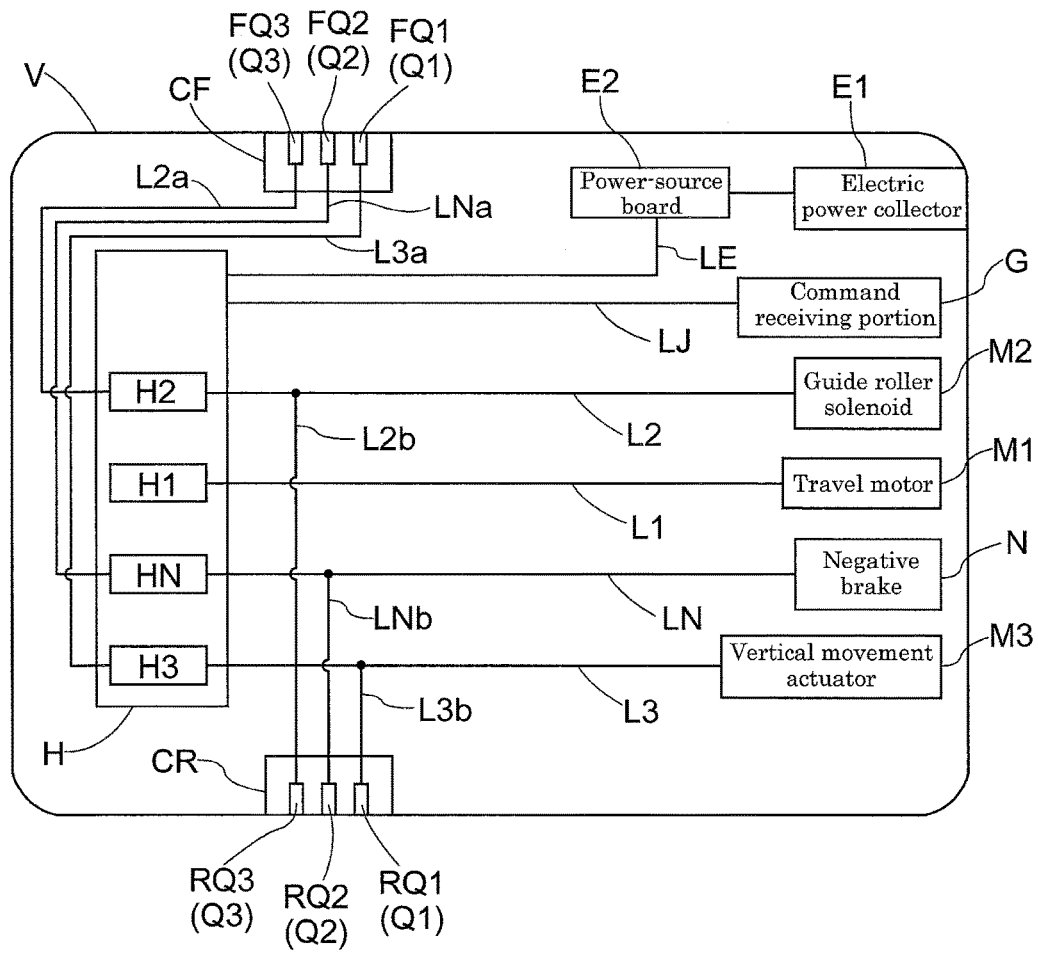
FIG. 5 is a control block diagram of the ceiling transport vehicle.

An example of controlling of the ceiling transport vehicle V is described next with reference to FIG. 5. Each ceiling transport vehicle V includes, among other things: an electric power collector E1 for collecting electric power in a non-contact fashion from a power supply rail provided along a travel rail R; a power-source board E2 for rectifying current and raising or lowering voltage to predetermined voltages to convert the electric power collected by the electric power collector E1 into driving or actuating electric power for each component of the ceiling travel vehicle; a command receiving portion G for receiving command information transmitted, such as a transport command, by means of electromagnetic waves or light; the travel motor M1; the guide roller solenoids M2; the vertical movement actuator M3; and the negative brake mechanism N, described above. In addition, the controller H for controlling operation of each component or portion of the ceiling transport vehicle V based on command information described above is provided to the ceiling transport vehicle V.

The power-source board E2 is electrically connected to the controller H and electric power is thus supplied to the controller H. In addition, the controller H includes, among other things, a control board consisting of a microcomputer, an arithmetic unit, etc., and an electric-power control board having a relay for switching the supply state of the electric power to, among other things, the travel motor M1, the guide roller solenoids M2, the vertical movement actuator M3, and the negative brake mechanism N, described above. In addition, the controller H and the command receiving portion G are connected to, and in communication with, each other. And the controller H is configured to be able to obtain the operating command information from a superordinate managing device and received by the command receiving portion G. In addition, the controller H transmits information including, among other information, results of operations of the ceiling transport vehicle V, to the superordinate managing device through the command receiving portion G.

In the present embodiment, the controller H functions as, includes, or is provided with, a travel motor controller H1 for controlling the supply state of actuating electric power to the travel motor M1, a guide roller solenoid controller H2 for controlling the supply state of the actuating electric power to the guide roller solenoids M2, a vertical movement controller H3 for controlling the supply state of the actuating electric power to the vertical movement actuator M3, and a negative brake controller HN for controlling the supply state of the electric power to deactivate the negative brake mechanism N. The travel motor controller H1 and the travel motor M1 are connected to each other by a first control line L1. Similarly, the guide roller solenoid controller H2 and the guide roller solenoids M2 are connected to each other by a second control line L2. The vertical movement controller H3 and the vertical movement actuator M3 are connected to each other by a third control line L3. And the negative brake controller HN and the negative brake mechanism N are connected to each other by a fourth control line LN.

In addition, a front side first connector terminal FQ1 (first terminal Q1) of a front side connector portion CF located at the front, with respect to the travel direction, of the travel portion 11 and the vertical movement controller H3 are connected to each other by a front side first external-control line L3a. Similarly, a front side second connector terminal FQ2 (second terminal Q2) of the front side connector portion CF and the negative brake controller HN are connected to each other by a front side second external-control line LNa. And a front side third connector terminal FQ3 (third terminal Q3) of the front side connector portion CF and the guide roller solenoid controller H2 are connected to each other by a front side third external-control line L2a.

Further, a back side first connector terminal RQ1 (first terminal Q1) of a back side connector portion CR located at the back, with respect to the travel direction, of the travel portion 11 is connected to a third control line L3 through a back side first external-control line L3b. In other words, the back side first connector terminal RQ1 is connected to a point between the vertical movement controller H3 and the vertical movement actuator M3. A back side second connector terminal RQ2 (second terminal Q2) of the back side connector portion CR is connected to a fourth control line LN through a back side second external-control line LNb. In other words, the back side second connector terminal RQ2 is connected to a point between the negative brake controller HN and the negative brake mechanism N. A back side third connector terminal RQ3 (third terminal Q3) of the back side connector portion CR is connected to a second control line L2 through a back side third external-control line L2b. In other words, the back side third connector terminal RQ3 is connected to a point between the guide roller solenoid controller H2 and the guide roller solenoids M2.

Figure 6:
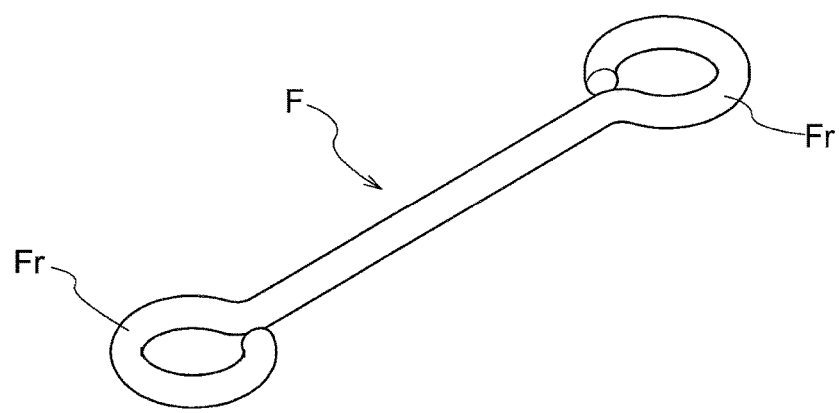
FIG. 6 is a perspective view of the entire linking member.
Figure 7:
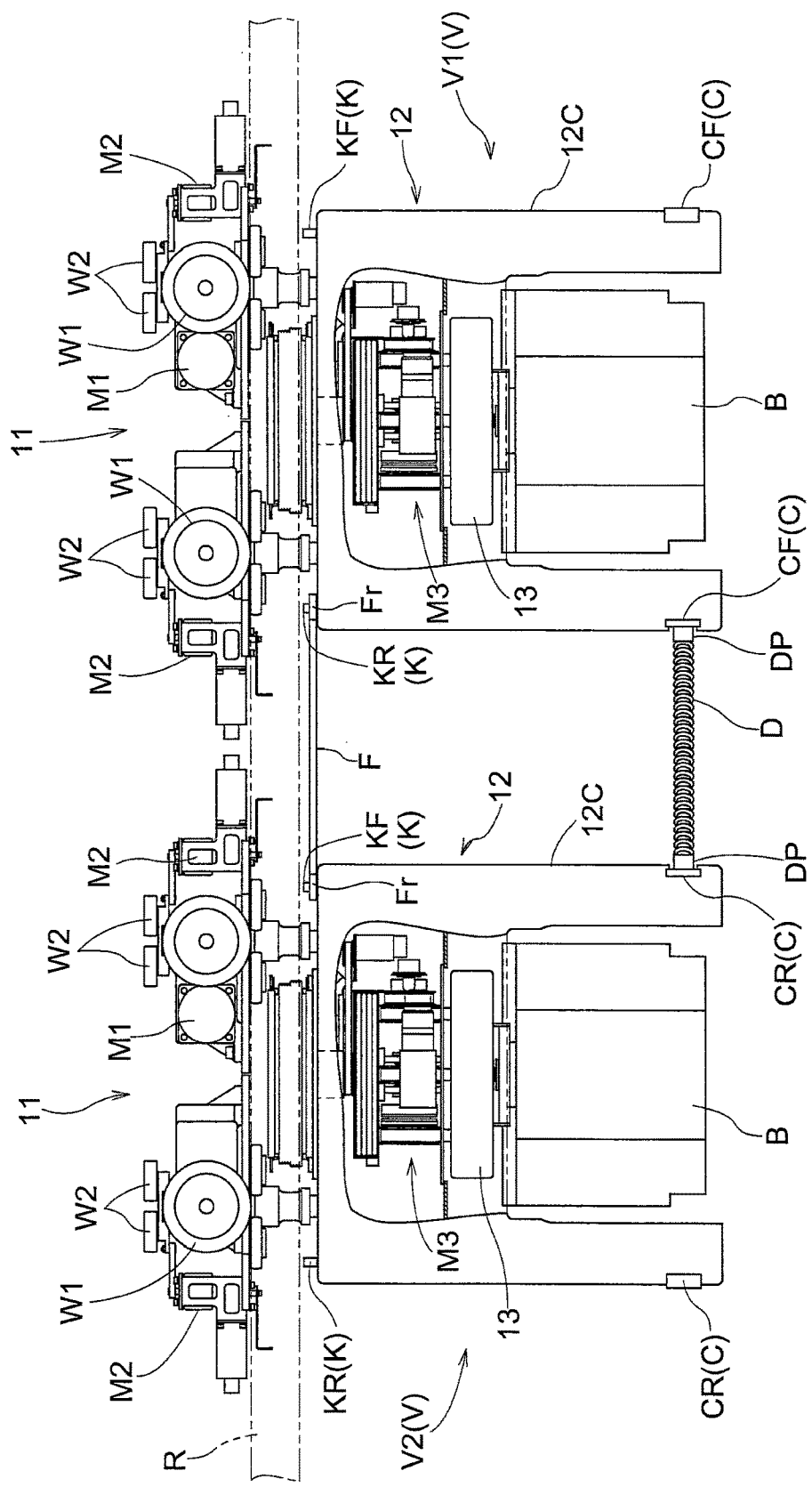
FIG. 7 is a side view showing a first travel member and a second travel member connected by a connecting member and the linking member.
Figure 8:
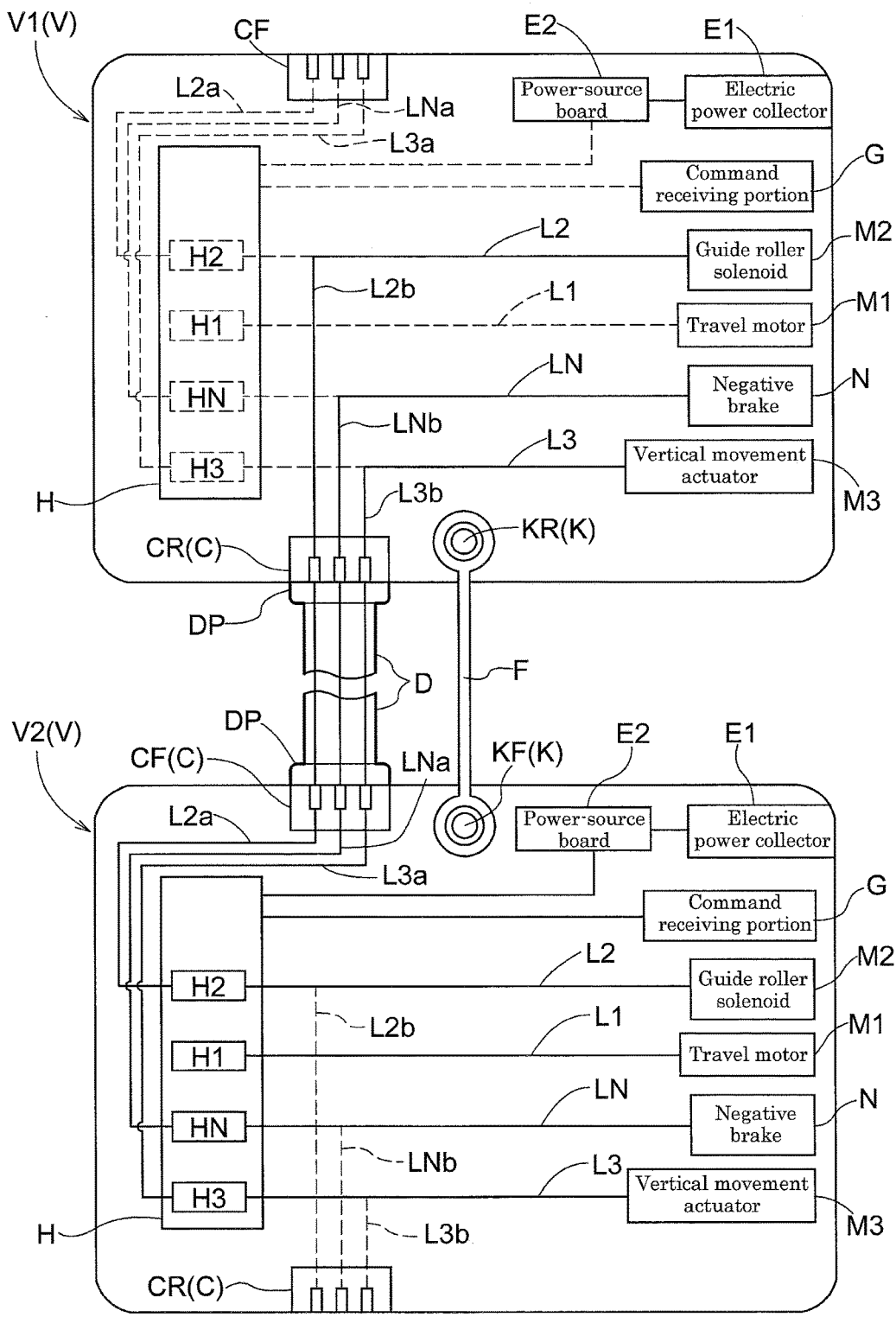
FIG. 8 is a control block diagram showing the control arrangement for when the first travel member and the second travel member are connected to each other by the connecting member.

Referring now to FIGS. 6-8, a remedy for when the negative brake mechanism N, the guide roller solenoids M2, or the vertical movement actuator M3 stops functioning due, for example, to a malfunction in the controller H (the situation will be referred to as "when the ceiling transport vehicle V malfunctions") is described next for the ceiling transport vehicles V described above.

In the present embodiment, when the ceiling transport vehicle V malfunctions, the malfunctioned ceiling transport vehicle V is moved and retrieved to a repair area by pushing the malfunctioned ceiling transport vehicle V with a separate and functioning ceiling transport vehicle V. During this time, the malfunctioned ceiling transport vehicle V and the functioning ceiling transport vehicle V are connected to each other such as to maintain a fixed distance therebetween when they are traveling on the same straight path. As shown in FIG. 6, a linking member F, which includes a rod shaped member with a looped portion Fr at both ends, is used for this connection. Not only the aforementioned rod shaped member, but a plate-shaped member etc. with holes that can engage the engaging projecting portions K (see FIGS. 1 and 8, etc.) may be used as the linking member F.

As shown in FIG. 7, when a certain ceiling transport vehicle V (V1: malfunctioned ceiling transport vehicle or a ceiling transport vehicle requiring relief) malfunctions, a functioning ceiling transport vehicle V (V2: relief ceiling transport vehicle) is caused to approach the malfunctioned ceiling transport vehicle from behind with respect to the travel direction. And one of the looped portions Fr of the linking member F shown in FIG. 6 is placed in engagement with the engaging projecting portion K at the front of the relief ceiling transport vehicle V2 (the front side engaging projecting portion KF of the relief ceiling transport vehicle V2 of FIG. 7) while the other looped portion Fr of the linking member F is placed in engagement with the engaging projecting portion K at the back of the malfunctioned ceiling transport vehicle V1 (the back side engaging projecting portion KR of the malfunctioned ceiling transport vehicle V1 of FIG. 7). That is, the travel facility is removably provided with the linking member F which connects or links the malfunctioned ceiling transport vehicle V1 and the relief ceiling transport vehicle V2 to each other while maintaining a fixed distance therebetween.

In addition, while the malfunctioned ceiling transport vehicle V1 and the relief ceiling transport vehicle V2 are connected or linked to each other by the linking member F, the front side connector portion CF which is the connector portion C at the front of the relief ceiling transport vehicle V2 and the back side connector portion CR which is the connector portion C at the back of the malfunctioned ceiling transport vehicle V1 are connected also by a connecting member D. The connecting member D has a plug portion DP at both ends which has a connector compatible with the corresponding connector terminals (Q1, Q2, Q3) of aforementioned connector portion C. This allows the connecting member D to electrically connect the front side connector terminals (FQ1, FQ2, FQ3) of the front side connector portion CF of the relief ceiling transport vehicle V2 to the back side connector terminals (RQ1, RQ2, RQ3) of the back side connector portion CR of the malfunctioned ceiling transport vehicle V1.

Regarding the order of establishing the connection or the linkage (mechanical linkage) between the malfunctioned ceiling transport vehicle V1 and the relief ceiling transport vehicle V2 by the linking member F and the connection (electrical connection) between the malfunctioned ceiling transport vehicle V1 and the relief ceiling transport vehicle V2 by the connecting member D, it is preferable to establish the mechanical linkage first; however, the electrical connection may be established first. In addition, in the present embodiment, the cables between the plug portions DP at both ends of the connecting member D are formed or grouped into a coiled cord. This allows for some changes in the distance between the back side connector portion CR of the malfunctioned ceiling transport vehicle V1 and the front side connector portion CF of the relief ceiling transport vehicle V2, for example, when the malfunctioned ceiling transport vehicle V1 and the relief ceiling transport vehicle V2 travel through a curved portion, or a branching portion J, etc.

In the present embodiment, each of the plurality of ceiling transport vehicles V is, or corresponds to, the travel member in the present invention. And the malfunctioned ceiling transport vehicle V1 which is the ceiling transport vehicle V that has malfunctioned, among the plurality of the ceiling transport vehicles V is, or corresponds to, the first travel member whereas a relief ceiling transport vehicles V2 which is a non-malfunctioned (i.e., correctly functioning) ceiling transport vehicle V is, or corresponds to, the second travel member. And the travel motor M1 and the negative brake mechanism N in the malfunctioned ceiling transport vehicle V1 are, or correspond to, the first travel actuator whereas the controller H of the malfunctioned ceiling transport vehicle V1 is, or corresponds to, the first controller. And the travel motor M1 and the negative brake mechanism N of the relief ceiling transport vehicle V2 are, or correspond to, the second travel actuator whereas the controller H of the relief ceiling transport vehicle V2 is, or corresponds to, the second controller.

FIG. 8 shows an example of a control configuration for when the back side connector portion CR of the malfunctioned ceiling transport vehicle V1 and the front side connector portion CF of the relief ceiling transport vehicle V2 are connected to each other by the connecting member D. When the back side connector portion CR of the malfunctioned ceiling transport vehicle V1 and the front side connector portion CF of the relief ceiling transport vehicle V2 are connected by the connecting member D, the second control line L2 connected to the guide roller solenoids M2 of the malfunctioned ceiling transport vehicle V1 becomes electrically connected to the back side third external-control line L2b. The forth control line LN connected to the negative brake mechanism N of the malfunctioned ceiling transport vehicle V1 becomes electrically connected to the back side second external-control line LNb. And the third control line L3 connected to the vertical movement actuator M3 of the malfunctioned ceiling transport vehicle V1 becomes electrically connected to the back side first external-control line L3b.

With these connections established, the control signal (more specifically electric power for switching the guide roller solenoids M2) outputted to the guide roller solenoids M2 from the guide roller solenoid controller H2 in the controller H of the relief ceiling transport vehicle V2 is transmitted to the guide roller solenoids M2 of the relief ceiling transport vehicle V2 through the second control line L2, and is simultaneously transmitted also to the guide roller solenoids M2 of the malfunctioned ceiling transport vehicle V1 through the front side third external-control line L2a of the relief ceiling transport vehicle V2, and the back side third external-control line L2b of the malfunctioned ceiling transport vehicle V1.

In addition and similarly, the control signal (more specifically electric power to suspend, or stop, the braking action of the negative brake mechanism N) outputted to the negative brake mechanism N from the negative brake controller HN in the controller H of the relief ceiling transport vehicle V2 is transmitted to the negative brake mechanism N of the relief ceiling transport vehicle V2 through the fourth control line LN and is simultaneously transmitted also to the negative brake mechanism N of the malfunctioned ceiling transport vehicle V1 through the front side second external-control line LNa of the relief ceiling transport vehicle V2 and the back side second external-control line LNb of the malfunctioned ceiling transport vehicle V1.

Further, the control signal (more specifically electric power for operating the vertical movement actuator M3) outputted to the vertical movement actuator M3 from the vertical movement controller H3 in the controller H of the relief ceiling transport vehicle V2 is transmitted to the vertical movement actuator M3 of the relief ceiling transport vehicle V2 through the third control line L3 and is simultaneously transmitted also to the vertical movement actuator M3 of the malfunctioned ceiling transport vehicle V1 through the front side first external-control line L3a of the relief ceiling transport vehicle V2 and the back side first external-control line L3b of the malfunctioned ceiling transport vehicle V1.

When causing the malfunctioned ceiling transport vehicle V1 to travel by connecting the relief ceiling transport vehicle V2 to the malfunctioned ceiling transport vehicle V1, the negative brake controller HN of the relief ceiling transport vehicle V2 first outputs electric power for suspending, or stopping, the braking action of the negative brake mechanism N of the relief ceiling transport vehicle V2. When this takes place, the electric power for suspending the braking action is also supplied to the negative brake mechanism N of the malfunctioned ceiling transport vehicle V1 through the front side second external-control line LNa of the relief ceiling transport vehicle V2 and the back side second external-control line LNb of the malfunctioned ceiling transport vehicle V1; thus, the braking action of the negative brake mechanism N of the malfunctioned ceiling transport vehicle V1 is also suspended.

In the present embodiment, the electric power for suspending the braking action is, or corresponds to, the suspending signal as a travel control signal. In other words, the malfunctioned ceiling transport vehicle 1 includes the negative brake mechanism N which applies braking force, to the travel motor M1, arising from urging force of an urging member when the suspending signal is not generated. And the controller H of the relief ceiling transport vehicle V2 is configured to be able to generate the suspending signal, as an external travel control signal, for suspending braking action of the negative brake mechanism N of the malfunctioned ceiling transport vehicle V1.

In addition, when the path along which the malfunctioned ceiling transport vehicle V1 is to travel needs to be changed in a branching portion J while the relief ceiling transport vehicle V2 and the malfunctioned ceiling transport vehicle V1 are connected to each other, The guide roller solenoid controller H2 of the relief ceiling transport vehicle V2 outputs electric power (electric power for position change) for causing the guide roller solenoids M2 to perform a position changing operation. When this happens, the electric power for position change is supplied also to the guide roller solenoids M2 of the malfunctioned ceiling transport vehicle V1 through the front side third external-control line L2a of the relief ceiling transport vehicle V2 and the back side third external-control line L2b of the malfunctioned ceiling transport vehicle V1. This causes both the guide roller solenoids M2 of the malfunctioned ceiling transport vehicle V1 and the guide roller solenoids M2 of the relief ceiling transport vehicle V2 to be changed to the same steering state.

In the present embodiment, the electric power for position change which the guide roller solenoid controller H2 of the relief ceiling transport vehicle V2 outputs to the guide roller solenoids M2 of the malfunctioned ceiling transport vehicle V1 is, or corresponds to, the external steering control signal. In other words, the malfunctioned ceiling transport vehicle V1 is provided with the guide roller solenoids M2 for changing its travel direction (i.e. of the malfunctioned ceiling transport vehicle V1) along the travel path T. And when the controller H of the malfunctioned ceiling transport vehicle V1 is configured to control the operation of the guide roller solenoids M2 of the malfunctioned ceiling transport vehicle V1, the controller H of the relief ceiling transport vehicle V2 is configured to be able to generate, as an external travel control signal, the electric power for position change for controlling the operation of the guide roller solenoids M2 of the malfunctioned ceiling transport vehicle V1. And the connecting member D is configured to receive and transmit the electric power for position change, i.e. to allow the electric power for position change to be communicated through the connecting member D.

Further, when the ceiling transport vehicle V (malfunctioned ceiling transport vehicle V1) malfunctions while the article B held by the vertically movable member 13 is located at a high location for transporting, the vertical movement controller H3 of the relief ceiling transport vehicle V2 outputs electric power for vertical movement for allowing the vertical movement actuator M3 to perform an lowering operation. When this happens, the electric power for vertical movement is supplied also to the vertical movement actuator M3 of the malfunctioned ceiling transport vehicle V1 through the front side first external-control line L3a of the relief ceiling transport vehicle V2 and the back side first external-control line L3b of the malfunctioned ceiling transport vehicle V1; thus, the vertical movement actuator M3 of the malfunctioned ceiling transport vehicle V1 can perform the required lowering operation.

In the present embodiment, the malfunctioned ceiling transport vehicle V1 is, or corresponds to, the transport travel member which can travel while holding an article B being transported. And the malfunctioned ceiling transport vehicle V1 includes the vertically movable member 13 which can be moved vertically while holding an article B, the vertical movement actuator M3 for vertically moving the vertically movable member 13, and the vertical movement controller H3 for controlling the operation of the vertical movement actuator M3. In addition, the electric power for vertical movement which the vertical movement controller H3 of the relief ceiling transport vehicle V2 outputs to the vertical movement actuator M3 of the malfunctioned ceiling transport vehicle V1 is, or corresponds to, the external vertical movement control signal. In other words, the controller H of and the relief ceiling transport vehicle V2 is configured to be able to generate the electric power for vertical movement for controlling the operation of the vertical movement actuator M3 of the malfunctioned ceiling transport vehicle V1. And the connecting member D is configured to receive and transmit the electric power for vertical movement, i.e. to allow the electric power for vertical movement to be communicated through the connecting member D.

That is, the controller H of the relief ceiling transport vehicle V2 functions as, or corresponds to, the external signal generating portion for generating the external travel control signal for the first travel actuator, the external steering control signal for controlling the operation of the steering operation portion, and the external vertical movement control signal for controlling the operation of the vertical movement actuator M3.

That is, the first travel member (malfunctioned ceiling transport vehicle V1) is provided as a travel member which is configured to travel along the travel path T. And the first travel member (malfunctioned ceiling transport vehicle V1) includes the first travel actuator for actuating or propelling the first travel member to cause the first travel member (malfunctioned ceiling transport vehicle V1) to travel, and the controller H which generates the travel control signal to be sent to the first travel actuator to control the actuating operation of the first travel actuator. In addition to the first travel member (malfunctioned ceiling transport vehicle V1), the second travel member (relief ceiling transport vehicle V2) is provided as a travel member which is configured to travel along the travel path T. And the second travel member (relief ceiling transport vehicle V2) includes the second travel actuator for propelling or actuating the second travel member to cause the second travel member (relief ceiling transport vehicle V2) to travel, and the controller H which generates the travel control signal to be sent to the second travel actuator to control the actuating operation of the second travel actuator.

In the present embodiment, the back side connector portion CR of the malfunctioned ceiling transport vehicle V1 is, or corresponds to, the first connecting portion of the present invention whereas the front side connector portion CF of the relief ceiling transport vehicle V2 is, or corresponds to, the second connecting portion of the present invention. In other words, the malfunctioned ceiling transport vehicle V1 includes the first connecting portion which can receive an external travel control signal and can transmit the external travel control signal to the first travel actuator (i.e., allow the external travel control signal to be communicated to the first travel actuator through the first connecting portion). And the relief ceiling transport vehicle V2 includes the second connecting portion which can transmit the external travel control signal (i.e., allow the external travel control signal to be communicated therethrough) which the controller H of the relief ceiling transport vehicle V2 generates. In addition, the connecting member D is provided which can receive and transmit an external travel control signal (i.e., allow the external travel control signal to be communicated through the connecting member D) and which can be removably connected to, and between, the back side connector portion CR of the malfunctioned ceiling transport vehicle V1 and the front side connector portion CF of the relief ceiling transport vehicle V2.

In addition, each ceiling transport vehicle V has the structure and functionality of both a malfunctioned ceiling transport vehicle V1 and a relief ceiling transport vehicle V2. When any given ceiling transport vehicle V malfunctions, that ceiling transport vehicle V functions as the malfunctioned ceiling transport vehicle V1. In addition, a ceiling transport vehicle V connected to this malfunctioned ceiling transport vehicle V1 by the connecting member D functions as the relief ceiling transport vehicle V2 in order to assist the malfunctioned ceiling transport vehicle V1. Therefore, each of the plurality of ceiling transport vehicles V includes the first connecting portion so as to be able to be a malfunctioned ceiling transport vehicle V1 as well as the second connecting portion and the external signal generating portion so as to be able to be a relief ceiling transport vehicle V2.

Alternative Embodiments (1) In the embodiment described above, an example of an arrangement is described in which the travel members are transport travel members which are ceiling or overhead transport vehicles V configured to travel along the travel rails R which are suspended and supported from the ceiling. However, a travel member only needs to be configured to travel along a travel path T and is not limited to the arrangement described above. For example, a travel member may be a transport travel member configured to travel along a rail installed on the floor, or may be a transport travel member configured to travel along a virtual travel route. Also, in the embodiment described above, an example is described in which transport travel members for transporting articles are provided as travel members. However, a travel member does not have to be limited to this arrangement and may be, for example, an inspection vehicle which mounts a measuring instrument to inspect subjects of inspection along a travel path. In addition, when a transport travel member is a stacker crane, the external vertical movement control signal in the aforementioned embodiment would be a signal for vertically moving the vertically movable platform of the stacker crane.

(2) In the embodiment described above, an arrangement is described in which the controller H, of the relief ceiling transport vehicle V2, which functions as an external signal generating portion, can transmit three kinds of signals to the malfunctioned ceiling transport vehicle V1 through the connecting member; namely, suspending electric power for suspending the braking action as an external travel control signal, electric power for position change as an external steering control signal, and electric power for vertical movement as an external vertical movement control signal. However, signal or signals which the controller H of the relief ceiling transport vehicle V2 can transmit to the malfunctioned ceiling transport vehicle V1 can be only any one or two of these three kinds. In addition, arrangements may be made so that the controller H of the relief ceiling transport vehicle V2 can transmit four or more kinds of signals to the malfunctioned ceiling transport vehicle V1. In this case, the same number of the connector terminals of the connector portion C as the number of the kinds of signals would be provided. In addition, in the embodiment described above, an example is described in which the electric power for suspending the braking action of the negative brake mechanism N of the malfunctioned ceiling transport vehicle V1 is the external travel control signal. However, the invention is not limited to such arrangement. And arrangement may be made so that actuating electric power for actuating the travel motor M1 of the malfunctioned ceiling transport vehicle V1 is outputted as an external travel control signal.

(3) In the embodiment described above, an example is described in which the external travel control signal is the suspending electric power for suspending the braking action of the negative brake mechanism N of the malfunctioned ceiling transport vehicle V1; the external steering control signal is the electric power for position change for causing the guide roller solenoids M2 of the malfunctioned ceiling transport vehicle V1 to perform a position changing operation; and, the external vertical movement control signal is the electric power for vertical movement for causing the vertical movement actuator M3 of the malfunctioned ceiling transport vehicle V1 to perform a vertical movement operation. However, the invention is not limited to these arrangements. For example, the controller H may be connected to an additional controller, for operating the negative brake mechanism N, the guide roller solenoids M2, and the vertical movement actuator M3, of the malfunctioned ceiling transport vehicle V1, by a USB cable or a LAN cable. And the logic signals transmitted to an aforementioned additional controller from the controller H may be designated as external travel control signals.

(4) In the embodiment described above, an example is described in which the relief ceiling transport vehicle V2 is positioned behind the malfunctioned ceiling transport vehicle V1 with respect to the travel direction so that the malfunctioned ceiling transport vehicle V1 can be moved by pushing it with the relief ceiling transport vehicle V2. However, the invention is not limited to such arrangement. Instead, the relief ceiling transport vehicle V2 is positioned in front of the malfunctioned ceiling transport vehicle V1 with respect to the travel direction so that the malfunctioned ceiling transport vehicle V1 can be moved by pulling it with the relief ceiling transport vehicle V2. In such a case, the linking member F, which is a rod shaped member in the embodiment described above for connecting the malfunctioned ceiling transport vehicle V1 and the relief ceiling transport vehicle V2 to each other while maintaining a fixed distance therebetween, may be of a cord or string like material such as a piece of rope or a chain.

(5) In the embodiment described above, an example is described in which the controller H of the relief ceiling transport vehicle V2 also functions as the external signal generating portion. However, an additional controller may be provided to the relief ceiling transport vehicle V2 to function as the external signal generating portion.

Summary of Embodiments

A brief summary of the travel facility described above is provided next.

In one embodiment, a travel facility, including travel members configured to travel along a travel path, comprises: a first travel member provided as one of the travel members; a first travel actuator provided to the first travel member for actuating the first travel member to cause the first travel member to travel; a first controller provided to the first travel member for generating a travel control signal to be sent to the first travel actuator to control actuating operation of the first travel actuator; a second travel member provided as another one of the travel members, separately from the first travel member; a second travel actuator provided to the second travel member for actuating the second travel member to cause the second travel member to travel; a second controller provided to the second travel member for generating a travel control signal to be sent to the second travel actuator to control actuating operation of the second travel actuator; an external signal generating portion provided to the second travel member for generating an external travel control signal to be sent to the first travel actuator; a first connecting portion provided to the first travel member for receiving the external travel control signal and transmitting the external travel control signal to the first travel actuator; a second connecting portion provided to the second travel member and capable of transmitting the external travel control signal generated by the external signal generating portion; and a connecting member removably connected to, and between, the first connecting portion and the second connecting portion, for receiving and transmitting the external travel control signal.

With the arrangement described above, when the first travel member becomes incapable of traveling along the travel path due to a malfunction of the first controller, the actuation or movement of the first travel member can be controlled by the second travel member. More specifically, the actuating operation of the first travel actuator can be controlled by the second travel member by transmitting the external travel control signal generated by the external signal generating portion of the second travel member to the first travel member through the connecting member. Therefore, even when the controller of a travel member malfunctions, the travel member can be moved to another location on the travel path.

Here, the first travel actuator is preferably provided with a negative brake mechanism which applies braking force, arising from urging force of an urging member provided in the first travel actuator, to the first travel actuator when the travel control signal to be sent to the first travel actuator is not generated, wherein the external signal generating portion preferably generates, as the external travel control signal, a suspending signal for suspending a braking action of the negative brake mechanism of the first travel member.

When the first travel member includes the negative brake mechanism described above, the negative brake mechanism would continue to apply braking force to the first travel actuator in the event that it becomes impossible to generate the travel control signal for the first travel actuator, due, for example, to a malfunction of the first controller. This makes it impossible for the first travel member to travel. With the arrangement described above, however, the external signal generating portion can generate, as the external travel control signal, a suspending signal for suspending or stopping the braking action of the negative brake mechanism of the first travel member. Thus, even in the event that it becomes impossible to generate the travel control signal for the first travel actuator in the first travel member, the suspending signal generated by the external signal generating portion of the second travel member can be transmitted to the first travel member through the connecting member. This suspends, or stops, the braking action of the negative brake mechanism to allow the first travel member to travel.

Further, it is preferable that a linking member is removably provided for connecting the first travel member and the second travel to each other, maintaining a fixed distance therebetween.

As described above, even if a malfunction, etc., occurs in the first travel member, the braking action of the negative brake mechanism of the first travel member can be suspended through the connecting member. In addition, when the first travel member and the second travel member are connected to each other by the linking member, the first travel member can be moved by pushing or pulling the first travel member by the second travel member. In other words, when the second travel actuator of the second travel member is activated to cause the second travel member to travel with the braking action of the negative brake mechanism suspended, the first travel member can be moved using the actuating force of the second travel member. During this process, the second travel member may be positioned in front of the first travel member with respect to the travel direction so that the first travel member can be pulled by the second travel member. Alternatively, the second travel member may be positioned behind the first travel member with respect to the travel direction so that the first travel member can be pushed by the second travel member. As such, even when the first travel actuator in the first travel member cannot generate the actuating force, the first travel member can be moved using the actuating force of the second travel member.

Also, in one embodiment, the first travel member preferably includes a steering operation portion for changing a travel direction, of the first travel member, along the travel path, wherein the first controller is preferably configured to control operation of the steering operation portion, wherein the external signal generating portion is preferably configured to generate an external steering control signal for controlling operation of the steering operation portion, and wherein the connecting member is preferably configured to receive and transmit the external steering control signal.

When it becomes impossible for the first controller to control the steering operation portion due, for example, to a malfunction of the controller, etc., it may become impossible to cause the first travel member to travel along a proper travel path.

However, with the present arrangement described above, the external signal generating portion can generate the external steering control signal for controlling the operation of the steering operation portion. Therefore, even in the even that the control signal for the steering operation portion cannot be generated in the first travel member, the operation of the steering operation portion of the first travel member can still be controlled by transmitting the external steering control signal to the first travel member through the connecting member. This makes it possible for the first travel member to be caused to travel along a proper travel path even when it becomes impossible for the first controller to control the steering operation portion.

In addition, in one embodiment, the travel path preferably includes a branching portion in which a path, along which the travel member travels, branches into a plurality of paths, and a guide rail for guiding travel of the travel member along the travel path, wherein the guide rail is preferably formed to branch, at the branching portion, into branching guide rails with at least one branching guide rail provided for each of the plurality of paths, wherein the travel member preferably has a guide member configured to be guided by the guide rail, and wherein the steering operation portion is preferably configured to change a position of the guide member to select a branching guide rail by which the first travel member is guided, among a plurality of the branching guide rails.

By arranging a guide rail to control the travel direction and by allowing the travel operating portion to select a branching guide rail as described above, it becomes possible to provide a transport facility in which a travel path is arranged to branch into a plurality of paths with a simple structure. When the steering operation portion malfunctions, selection of a branching guide rail becomes impossible. However, the external signal generating portion can generate the external steering control signal for controlling the operation of the steering operation portion as described above. Thus, the guide member can be operated to be guided by the proper branching guide rail among the plurality of branching guide rails. This allows the first travel member to travel along the proper travel path.

In addition, in one embodiment, when the first travel member is a transport travel member which can travel while holding an article that is being transported and when the transport travel member includes a vertically movable member which can hold an article and can be vertically moved, a vertical movement actuator for vertically moving the vertically movable member, and a vertical movement controller for controlling operation of the vertical movement actuator, the external signal generating portion is preferably configured to be able to generate an external vertical movement control signal for activating the vertical movement actuator of the first travel member, and the connecting member is preferably configured to receive and transmit the external vertical movement control signal.

When it becomes impossible to operate the vertical movement actuator due, for example, to a malfunction of the vertical movement controller, a problem may occur, for example, that the article cannot be lowered from a high location for transporting. With the arrangement described above, the operation of the vertical movement actuator can still be controlled by transmitting the external vertical movement control signal generated by the external signal generating portion of the second travel member to the first travel member through the connecting member. This allows the article to be recovered, for example, by lowering the vertically movable member holding the article to a worker's working height.

In one embodiment, the travel facility preferably includes a plurality of the travel members wherein each of the plurality of the travel members preferably includes the first connecting portion so as to be able to be the first travel member, and the second connecting portion and the external signal generating portion so as to be able to be the second travel member.

With the arrangement described above, even when the controller of a certain travel member malfunctions so that it becomes impossible to control the travelling of the travel member, the travel direction changing operation by the steering operation portion, or the vertical movement operation of the vertically movable member by the vertical movement actuator, another travel member can rescue, or provide relief to, the malfunctioned travel member. In the event that any one of the travel members malfunctions, any other one of the travel members can be used to provide relief to the malfunctioned travel member. In other words, the malfunctioned travel member becomes the first travel member, and the other rescuing travel member becomes the second travel member. And by connecting the travel member which is the second travel member and the travel member which is the first travel member, by the connecting member, it becomes possible to cause the first travel member to travel and to be steered, and to cause the vertically movable member to be vertically moved.

What is claimed is:

1. A travel facility including travel members configured to travel along a travel path, the travel facility comprising:
    a first travel member provided as one of the travel members;
    a first travel actuator provided to the first travel member for actuating the first travel member to cause the first travel member to travel;
    a steering operation portion provided to the first travel member for changing a travel direction of the first travel member along the travel path;
    a first controller provided to the first travel member for generating a travel control signal to be sent to the first travel actuator to control actuating operation of the first travel actuator and to control operation of the steering operation portion;
    a second travel member provided as another one of the travel members, separately from the first travel member;
    a second travel actuator provided to the second travel member for actuating the second travel member to cause the second travel member to travel;
    a second controller provided to the second travel member for generating a travel control signal to be sent to the second travel actuator to control actuating operation of the second travel actuator, wherein the second controller comprises an external signal generating portion for generating an external travel control signal to be sent to the first travel actuator and for generating an external steering control signal to be sent to the steering operation portion;
    a first connecting portion provided to the first travel member for receiving the external travel control signal and transmitting the external travel control signal to the first travel actuator, and for receiving the external steering control signal and transmitting the external steering control signal to the steering operation portion;
    a second connecting portion provided to the second travel member and capable of transmitting the external travel control signal generated by the external signal generating portion; and
    a connecting member removably connected to, and between, the first connecting portion and the second connecting portion, for receiving and transmitting the external travel control signal and the external steering control signal.

2. The travel facility as defined in claim 1,
wherein the first travel actuator is provided with a negative brake mechanism which applies braking force, arising from urging force of an urging member provided in the first travel actuator, to the first travel actuator when the travel control signal to be sent to the first travel actuator is not generated, and
wherein the external signal generating portion generates, as the external travel control signal, a suspending signal for suspending a braking action of the negative brake mechanism of the first travel member.

3. The travel facility as defined in claim 2, further comprising:
a linking member removably provided for connecting the first travel member and the second travel member to each other, maintaining a fixed distance therebetween.

4. The travel facility as defined in claim 1,
wherein the travel path includes a branching portion in which a path, along which the travel member travels, branches into a plurality of paths, and a guide rail for guiding travel of the travel member along the travel path,
wherein the guide rail is formed to branch, at the branching portion, into branching guide rails with at least one branching guide rail provided for each of the plurality of paths,
wherein the travel member has a guide member configured to be guided by the guide rail, and
wherein the steering operation portion is configured to change a position of the guide member to select a branching guide rail by which the first travel member is guided, among a plurality of the branching guide rails.

5. The travel facility as defined in claim 1,
wherein the first travel member is a transport travel member which can travel while holding an article that is being transported,
wherein the transport travel member includes a vertically movable member which can hold an article and can be vertically moved, a vertical movement actuator for vertically moving the vertically movable member, and a vertical movement controller for controlling operation of the vertical movement actuator,
wherein the external signal generating portion is configured to be able to generate an external vertical movement control signal for activating the vertical movement actuator of the first travel member, and
wherein the connecting member is configured to receive and transmit the external vertical movement control signal.

6. The travel facility as defined in claim 1,
wherein a plurality of the travel members are provided,
wherein each of the plurality of the travel members includes the first connecting portion so as to be able to be the first travel member, and the second connecting portion and the external signal generating portion so as to be able to be the second travel member.

7. The travel facility as defined in claim 4,
wherein the first travel member is a transport travel member which can travel while holding an article that is being transported,
wherein the transport travel member includes a vertically movable member which can hold an article and can be vertically moved, a vertical movement actuator for vertically moving the vertically movable member, a vertical movement controller for controlling operation of the vertical movement actuator,
wherein the external signal generating portion is configured to be able to generate an external vertical movement control signal for activating the vertical movement actuator of the first travel member, and
wherein the connecting member is configured to receive and transmit the external vertical movement control signal.

8. The travel facility as defined in claim 4,
wherein a plurality of the travel members are provided,
wherein each of the plurality of the travel members includes the first connecting portion so as to be able to be the first travel member, and the second connecting portion and the external signal generating portion so as to be able to be the second travel member.

9. The travel facility as defined in claim 7,
wherein a plurality of the travel members are provided,
wherein each of the plurality of the travel members includes the first connecting portion so as to be able to be the first travel member, and the second connecting portion and the external signal generating portion so as to be able to be the second travel member.

10. The travel facility as defined in claim 3,
wherein the first travel member includes a steering operation portion for changing a travel direction, of the first travel member, along the travel path,
wherein the first controller is configured to control operation of the steering operation portion,
wherein the external signal generating portion is configured to generate an external steering control signal for controlling operation of the steering operation portion, and
wherein the connecting member is configured to receive and transmit the external steering control signal.

11. The travel facility as defined in claim 10,
wherein the travel path includes a branching portion in which a path, along which the travel member travels, branches into a plurality of paths, and a guide rail for guiding travel of the travel member along the travel path,
wherein the guide rail is formed to branch, at the branching portion, into branching guide rails with at least one branching guide rail provided for each of the plurality of paths,
wherein the travel member has a guide member configured to be guided by the guide rail, and
wherein the steering operation portion is configured to change a position of the guide member to select a branching guide rail by which the first travel member is guided, among a plurality of the branching guide rails.

12. The travel facility as defined in claim 3,
wherein the first travel member is a transport travel member which can travel while holding an article that is being transported,
wherein the transport travel member includes a vertically movable member which can hold an article and can be vertically moved, a vertical movement actuator for vertically moving the vertically movable member, a vertical movement controller for controlling operation of the vertical movement actuator,
wherein the external signal generating portion is configured to be able to generate an external vertical movement control signal for activating the vertical movement actuator of the first travel member, and wherein the connecting member is configured to receive and transmit the external vertical movement control signal.

13. The travel facility as defined in claim 11,
wherein the first travel member is a transport travel member which can travel while holding an article that is being transported,
wherein the transport travel member includes a vertically movable member which can hold an article and can be vertically moved, a vertical movement actuator for vertically moving the vertically movable member, a vertical movement controller for controlling operation of the vertical movement actuator,
wherein the external signal generating portion is configured to be able to generate an external vertical movement control signal for activating the vertical movement actuator of the first travel member, and
wherein the connecting member is configured to receive and transmit the external vertical movement control signal.

14. The travel facility as defined in claim 3,
wherein a plurality of the travel members are provided,
wherein each of the plurality of the travel members includes the first connecting portion so as to be able to be the first travel member, and the second connecting portion and the external signal generating portion so as to be able to be the second travel member.

15. The travel facility as defined in claim 11,
wherein a plurality of the travel members are provided,
wherein each of the plurality of the travel members includes the first connecting portion so as to be able to be the first travel member, and the second connecting portion and the external signal generating portion so as to be able to be the second travel member.

16. The travel facility as defined in claim 13,
wherein a plurality of the travel members are provided,
wherein each of the plurality of the travel members includes the first connecting portion so as to be able to be the first travel member, and the second connecting portion and the external signal generating portion so as to be able to be the second travel member.

17. The travel facility as defined in claim 1,
wherein the external signal generating portion generates an external travel control signal for driving the first travel actuator in replacement of the first controller.

\* \* \* \* \*